United States Patent
Gallo et al.

(10) Patent No.: US 10,115,243 B2
(45) Date of Patent: Oct. 30, 2018

(54) NEAR FIELD COMMUNICATION SYSTEM

(71) Applicant: NXP B.V., Eindhoven (NL)

(72) Inventors: Francesco Gallo, Graz (AT); Andreas Muehlberger, Eisbach (AT); Christian Lesjak, Semriach (AT)

(73) Assignee: NXP B.V., Eindhoven (NL)

( * ) Notice: Subject to any disclaimer, the term of this patent is extended or adjusted under 35 U.S.C. 154(b) by 3 days.

(21) Appl. No.: 14/748,170

(22) Filed: Jun. 23, 2015

(65) Prior Publication Data
US 2015/0371453 A1    Dec. 24, 2015

(30) Foreign Application Priority Data
Jun. 23, 2014 (EP) .................................. 14173544

(51) Int. Cl.
| G05B 19/00 | (2006.01) |
| G07C 1/10 | (2006.01) |
| G07C 9/00 | (2006.01) |
| G06F 21/35 | (2013.01) |
| H04W 12/06 | (2009.01) |

(Continued)

(52) U.S. Cl.
CPC ............. *G07C 1/10* (2013.01); *G06F 21/35* (2013.01); *G07C 9/00007* (2013.01); *H04W 4/80* (2018.02); *H04W 12/06* (2013.01); *G06Q 10/10* (2013.01)

(58) Field of Classification Search
CPC ..... G07C 1/10; G07C 9/00007; H04W 4/008; H04W 12/06; H04W 4/80; G06F 21/35; G06Q 10/10

USPC .............. 340/5.65, 10.1–10.6, 572.1–572.9
See application file for complete search history.

(56) References Cited

U.S. PATENT DOCUMENTS 8,490,162 B1 * 7/2013 Popoveniuc .......... G06F 21/316
                                                                            713/182
8,731,583 B2 * 5/2014 Wengrovitz ........ H04M 1/7253
                                                                            455/411

(Continued)

FOREIGN PATENT DOCUMENTS

| EP | 2 487 629 A1 | 8/2012 |
| GB | 2 507 742 A | 5/2014 |
| WO | 2013/0163338 A2 | 10/2013 |

OTHER PUBLICATIONS

Extended European Search Report for Patent Appln. No. 14173544.9 (dated Oct. 16, 2014).

(Continued)

*Primary Examiner* — Kerri McNally
*Assistant Examiner* — Thang Tran

(57) ABSTRACT

The disclosure relates to a method of operating a system, the system comprising a near field communication, NFC, tag, an NFC device associated with a user of the system and a computer, the method comprising: the NFC device requesting a message from the NFC tag; the NFC tag generating a message comprising a representation of a counter value; the NFC tag sending the message to the NFC device; the NFC device generating a request comprising the representation of the counter value in response to receiving the message; the NFC device sending the request to a computer; the NFC device submitting user authentication data to the computer; and the computer executing an operation on verification of the counter value and the authentication data.

20 Claims, 1 Drawing Sheet

(51) Int. Cl.
*H04W 4/80* (2018.01)
*G06Q 10/10* (2012.01)

(56) References Cited

U.S. PATENT DOCUMENTS

| | | | | |
|---|---|---|---|---|
| 8,752,156 | B1* | 6/2014 | Van Dijk | H04W 12/06 726/9 |
| 9,119,069 | B1* | 8/2015 | Vipond | H04W 12/06 |
| 9,594,896 | B2* | 3/2017 | Rosati | G06F 21/44 |
| 2006/0225133 | A1* | 10/2006 | Balasubramaniyan | H04L 63/1458 726/22 |
| 2008/0186180 | A1* | 8/2008 | Butler | G06K 19/0723 340/572.1 |
| 2008/0222711 | A1* | 9/2008 | Michaelis | G07C 9/00039 726/7 |
| 2009/0064313 | A1* | 3/2009 | Zampiello | H04L 63/08 726/17 |
| 2009/0113527 | A1* | 4/2009 | Naaman | G06F 21/41 726/5 |
| 2009/0144550 | A1* | 6/2009 | Arunan | H04L 63/068 713/171 |
| 2011/0035604 | A1* | 2/2011 | Habraken | G06F 21/32 713/193 |
| 2012/0207305 | A1* | 8/2012 | Gallo | G06Q 10/10 380/271 |
| 2013/0282438 | A1* | 10/2013 | Hunter | G01S 1/02 705/7.32 |
| 2014/0025520 | A1* | 1/2014 | Mardikar | G06Q 20/40145 705/21 |
| 2014/0088731 | A1* | 3/2014 | Von Hauck | H04W 12/06 700/14 |
| 2014/0139347 | A1* | 5/2014 | Forster | G06K 7/10128 340/686.6 |
| 2014/0167963 | A1* | 6/2014 | Ferragne | G08B 13/2462 340/572.1 |
| 2014/0201517 | A1* | 7/2014 | Corrion | H04L 63/0838 713/155 |
| 2014/0236697 | A1* | 8/2014 | Seo | G06Q 30/0238 705/14.26 |
| 2014/0282958 | A1* | 9/2014 | Salonen | H04L 63/0861 726/7 |
| 2014/0357187 | A1* | 12/2014 | Ehrensvard | H04L 63/0838 455/41.1 |
| 2015/0019424 | A1* | 1/2015 | Pourfallah | G06Q 40/02 705/43 |
| 2015/0102909 | A1* | 4/2015 | Hinz | H04L 9/3234 340/10.1 |
| 2015/0188712 | A1* | 7/2015 | Teuwen | G06K 7/10267 713/176 |
| 2015/0254677 | A1* | 9/2015 | Huxham | G06K 19/0709 705/57 |

OTHER PUBLICATIONS

"NFC Forum Type Tags—White Paper V1.0", NXP, 24 pgs, retrieved from the internet at: http://members.nfc-forum.org/resources/white_papers/NXP_BV_Type_Tags_White_Paper-Apr_09.pdf (Apr. 1, 2009).

"NFC TagInfo by NXP" Google Play, 2 pgs, retrieved from https://archive.org/ for: https://play.google.com/store/apps/details?id=com.nxp.taginfolite (May 12, 2013).

* cited by examiner

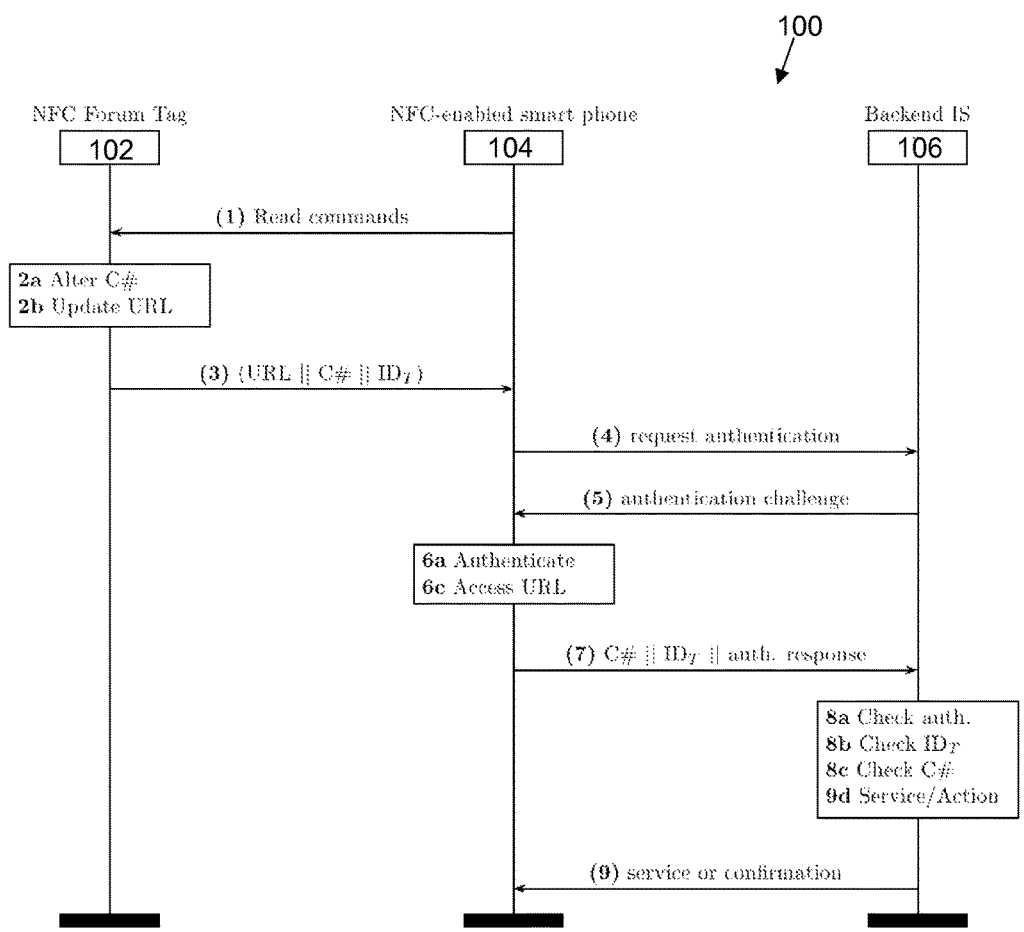

NEAR FIELD COMMUNICATION SYSTEM

CROSS-REFERENCE TO RELATED APPLICATIONS

This application claims the priority under 35 U.S.C. § 119 of European patent application no. 14173544.9, filed on Jun. 23, 2014, the contents of which are incorporated by reference herein.

The invention relates to a method of operating a system comprising a near field communication, NFC, tag.

Identification products, such as smart cards and RFID tags, are widely used in fields such as transport (ticketing, road tolling, baggage tagging), finance (debit and credit cards, electronic purse, merchant card), communications (SIM card for GSM phone), and tracking (access control, inventory management, asset tracking). RFID is an acronym of radio frequency identification. International standard ISO14443A is the industry standard for contactless smart cards. ISO14443A-compliant products such as MIFARE provide RF communication technology for transmitting data between a card or tag and a reader device. For example, in electronic ticketing for public transport, travelers wave their card over a reader at the turnstiles or entry point, benefiting from improved convenience and speed in the ticketing process. Such products are said to be the key to individual mobility in the future, supporting multiple applications including road tolling, airline tickets, access control and many more.

Evolving from a combination of contactless identification and networking technologies, near field communication (NFC) is a very short-range wireless technology, for distances measured in centimeters. NFC technology can be applied to consumer electronics devices such as mobile telephones and personal computers, for example.

NFC has been described on the website http://www.nxp-.com/nfc and in the standard ISO/IEC 18092. NFC technology is optimized for intuitive, easy and secure communication between various devices without the need for manual configuration by a user. In order to make two devices communicate, users bring them close together or make them touch. The devices comprise NFC interfaces that will automatically connect and configure themselves to form a peer-to-peer network. NFC can also bootstrap other protocols like Bluetooth or wireless Ethernet (Wi-Fi) by exchanging configuration and session data. NFC is compatible with contactless smart card platforms. This enables NFC devices to read information from these cards, making contactless smart cards the ideal solution for bringing information and vouchers into the NFC world. NFC devices can also operate like a contactless card or tag, which makes them compatible with the existing infrastructure of ISO14443A-compliant systems.

The NFC Forum (http://www.nfc-forum.org/) is a non-profit industry association which promotes the use of NFC short-range wireless interaction in the fields of consumer electronics, mobile devices and personal computers. The NFC Forum promotes the implementation and standardization of NFC technology to ensure interoperability between devices and services.

An NFC Forum tag can be read by any NFC-compliant device, such as a smart phone. NFC tags may be associated with services that are available to the NFC device from a server by touching the device to the tag.

It is possible to read out static content from a genuine tag and write this content to another NFC tag in order to create a cloned tag. The cloned tag may be used by an unauthorised user to gain access to a service without needing to access the genuine tag. In addition, the static content of the tag can be read and stored by an NFC smart phone. An attacker may modify a smart phone application to develop a malicious application that uses the static content to access a service without needing to touch the genuine tag. Therefore an attacker can easily circumvent the requirement to be physically present in the vicinity of the tag in order to gain access to the service.

According to a first aspect of the invention there is provided a method of operating a system, the system comprising a near field communication, NFC, tag, an NFC device associated with a user of the system and a computer, the method comprising:

the NFC device requesting a message from the NFC tag;
the NFC tag generating a message comprising a representation of a counter value;
the NFC tag sending the message to the NFC device;
the NFC device generating a request comprising the representation of the counter value in response to receiving the message;
the NFC device sending the request to a computer;
the NFC device submitting user authentication data to the computer; and
the computer executing an operation on verification of the counter value and the authentication data.

The counter of the tag can be configured to amend the counter value in response to receiving the request from the NFC device according to a predetermined function, which may be as simple as incrementing the counter value. By incorporating a counter inside the NFC Forum Tag it is no longer possible to copy static content to another tag in order to clone the tag because counter logic within the tag alters the content of the tag upon each read access.

Requiring user authentication can mean that a specific individual that is registered with the system can be associated with a request for a service. The combination of requesting user authentication and the use of a counter provides a more secure system because a registered user can be discouraged from making anonymous requests that contain invalid counter details without risking detection. As such, an attacker can be discouraged from attempting a trial-and-error-type attack in which a large number of anonymous requests with different possible counter values are attempted in order to obtain a service from the computer. This is because such an attack would have to be associated with a registered user in order to have the possibility of obtaining a service and the unsuccessful attempts may be logged so that action can be taken against the user.

The method may further comprise the NFC device submitting user authentication data to the computer as part of sending the request to the computer. The NFC device may submit user authentication data to the computer before or after sending the request to a computer. The computer may generate a request for the user authentication data from the NFC device. The request for the user authentication data may comprise a log-on or password screen. The user authentication data may comprise a password, personal identification code or biometric information associated with the user. Biometric information includes a finger or thumb print, iris scan, or voice pattern of the user, for example.

The method may further comprise the NFC tag obfuscating or encrypting the counter value before generating the message. The method may comprise the NFC tag signing the message before sending the message to the NFC device. The NFC tag may apply a hash function to the counter value to provide a hashed counter value. The computer may generate one or more hashed expected values corresponding to one or more expected counter values. The one or more expected values may be the subsequent values in a counter value sequence to the most recently received counter value from the tag. The computer may compare the hashed counter value with the one or more hashed expected values in order to determine the counter value from the tag.

The message may comprise a uniform resource identifier, URI, for the computer, wherein the URI includes the counter value and the identifier of the tag. The computer may be a remote server on the internet. The uniform resource identifier may be an internet address, such as a universal resource location, associated with the computer.

The message generated by the tag and/or the request generated by the device may comprise an identifier of the tag.

An identifier for the computer may be stored on the NFC device. The NFC device may perform the step of requesting a message and generating the request using generic software. Generic software may be able to perform a number of non-proprietary functions or may have standard functions for interacting with other software. For example, a web browser is an example of a piece of generic software because the functions of communicating with a web server are the subject of agreed standards. Generic software may only use open protocols. Open protocols are protocols that are available to the public so that third party developers can implement them in software.

The message may be an NFC Data Exchange Format, NDEF, message.

The method may further comprise the NFC device including sensor data in the request and/or the NFC tag including sensor data in the message. The method may further comprise the NFC device taking a photograph in order to provide the sensor data. The method may further comprise the NFC device recording audio in order to provide the sensor data. The method may comprise the computer using the sensor data in order to verify the identifier of the user or verify an identifier of the NFC tag.

According to a further aspect of the invention there is provided a method of operating a time entry recording system, TERS, comprising performing the method of any preceding claim, wherein the NFC tag is associated with a function (for example, arrive or leave) of the TERS, the NFC device is associated with a user of the TERS and the step of the computer executing the operation comprises recording a time associated with the function of the TERS and the user of the NFC device.

According to a further aspect of the invention there is provided a method of operating an electronic poster, comprising performing the method of any preceding claim. The NFC tag may be embedded in the poster. The method may further comprise the NFC tag providing a URL for an electronic coupon and the computer.

According to a further aspect of the invention there is provided a system comprising a near field communication, NFC, tag, an NFC device associated with a user of the system and a computer, the system configured to perform the method of any preceding claim.

According to a further aspect of the invention there is provided a computer for a time entry recording system, configured to:
  receive one or more requests from a NFC device, the one or more requests comprising:
    an identifier of the tag that is associated with a function of a time entry recording system,
    a representation of a counter value, and
    user authentication data for a user of the NFC device;
  verify the counter value;
  verify the authentication data; and
  record a time associated with the function of the TERS and the user of the NFC device upon verification of the counter value and the authentication data.

Embodiments will now be described by way of example with reference to the accompanying FIGURE, in which FIG. 1 illustrates a NFC system that is used to illustrate a method of operating the NFC system.

The NFC system 100 comprises a near field communication, NFC, tag 102, an NFC device 104 and a computer 104. The NFC device 104 may be provided by an NFC enabled smart phone and the computer 106 acts as a backend information system, or server.

The tag 102 comprises counter logic, a tag ID ($ID_T$) and a NFC device exchange format, NDEF, message generator.

The counter logic operates on a counter value (C#). The counter logic is configured to alter the counter logic according to a predetermined rule, by incrementing the count value for example. The counter logic may also save or overwrite the counter value that is stored in the memory of the tag 102 with the altered counter value (C#). Alteration of the counter value (C#) may be triggered by the device 104 reading the tag 102. The counter value (C#) cannot be modified except by the counter logic of the tag 102, in some examples. An expected value for the counter value may be known to the computer 106. In some examples, the counter logic may have been initialized by the computer 106.

The NDEF message generator may be configured to insert the counter value (C#) into an NDEF message as part of a universal resource identifier, URI, such as a universal resource locator, URL. An electronic signature may be applied to the counter value (C#), URI or NDEF message. The NFC tag may obfuscate or encrypt the counter value (C#) before generating the NDEF message. The use of an electronic signature, obfuscation or encryption may further increase the security of the system.

The tag 102 can be identified by the tag ID ($ID_T$), which is unique in at least the context of the system 100. The tag ($ID_T$) may be provided by data in the memory of the tag 102. Different tags, and so different tag IDs ($ID_T$), may be associated with different actions or services provided by the computer. For example, in a time recording system, touching a first tag with a device may cause a first message to be sent from the first tag to the device 104 and relayed by the device to the computer 106. The first message may be indicative of an employee entering a building. Touching a second tag with the device 104 may cause a second message to be sent from the second tag to the device 104 and relayed by the device to the computer. The second message may be indicative of the employee leaving the building.

The device 104 may be an NFC-enabled smart phone that belongs to a user of the system 100. The user is issued with credentials, which may be a digital certificate that is stored in the memory of the smart phone. In addition or alternatively, the credentials may comprise a username and password combination, which may either be stored in a protected area of the smart phone memory or supplied by the user on demand.

The device 104 is an NFC Forum device and is capable of reading the NDEF message received from the tag 102 according the NFC Forum Type Tag Operation specification. The device 104 is also capable of generating a request for the computer 106 including information received from the tag 102 including the URL that comprises the counter value (C#). The request to the computer 106 may be any kind of internet based communication, such as a request to access a website, download data representative of a specific content, or a communication with a web-service offered by the server.

The reading and requesting functionality of the device 104 may be implemented using generic software. The generic software may be able to perform a number of non-proprietary functions or may have standard functions for interacting with other software. The generic software may only use open protocols that are available to the public so that third party developers can implement them in software. A web browser is an example of a piece of generic software because the functions of communicating with a web server are the subject of agreed standards; HTML and CSS are examples of open protocols. The NDEF message format is also an example of an open protocol.

The computer 106 is configured to execute an operation on verification of the counter value (C#) and the authentication data. The computer 106, or backend information system, IS, may be accessible by the device 104 via the Internet or any other network and provides an application programming interface to communicate with the device 104. All tag IDs ($ID_T$) in the system 100 may be stored in a database of the computer 106 and associated with the corresponding action or service.

Access to the computer 106 by the device 104 is secured by the user authentication and optionally also by electronic signature, obfuscation or encryption of the counter value (C#). For each user, credentials can be issued in advance of use of the system. The user authentication data may comprise a digital certificate, username, password, personal identification code or biometric information associated with the user. Allowing only authenticated users to access the computer 106 discourages malicious use of the system because unauthenticated requests by the system are ignored. In addition, user activity can be identified as belonging to a particular user and the users are personally responsible for malicious activity, which also decrease any incentive to attack the system.

The computer 106 can enforce the technical security provided by the system in one or more of a number of ways:
   Each access to the system must be authenticated. This reduces the likelihood of successful attacks from outsiders who have not previously been issued credentials. Attempted unauthenticated access to the backend may be logged.
   A registered user (a person to whom credentials have been issued) may attempt to exploit the system using a malicious reader app on a smart phone that transmits a series of guesses of counter value (C#) to the backend system. The system can detect the attempted use of an invalid counter value (C#) and so the user may be held responsible for this attack. For example, the user's account may be deleted or suspended.

The computer 106 can use a number of methods to detect attempted malicious activity:
   The counter value (C#) is altered in a predetermined sequence, for example the counter value (C#) is incremented by 1 upon each read of the tag 102. Previously received counter values are stored in a database of the computer 106. A new counter value received from the tag 102 may not be verified if the new counter value is lower than (or earlier in the predetermined sequence than) the last verified counter value in the database. Access to the system may be denied in the case where the counter value is not verified.

A sudden increase of the counter value (by an attacker trying to guess an upcoming counter value (C#)), can also be detected by the backend system and cause the counter value not to be verified. The new counter value received from the tag 102 may not be verified if the new counter value is more than a predetermined number of counts greater than (or later in the predetermined sequence than) the last verified counter value.

From the number of expected daily users of the system, predications about the expected change of the counter value (C#) transmitted to the backend system allow detection algorithms to identify malicious attempts. For example, the detection algorithm may determine whether a frequency of the requests deviates from a normal frequency of requests by more than a threshold value.

The system 100 illustrated in FIG. 1 enables a method to be performed by the tag 102, device 104 and computer 106. In general, the method may be applied to any system comprising a tag, an NFC device and a computer, where the purpose of the tag is to trigger an action in the computer upon touching the tag with the device 104.

The method comprises one or more of the steps of:
1. The NFC-enabled smart phone (device 104) undertakes the necessary steps to read the information contained on the tag 102. This step is initiated after the smart phone user touches the tag 102 with the device 104.
2. The tag 102 undertakes two actions before sending an NDEF message to the device 104:
   a) the tag 102 alters the counter value (C#) according to a rule (for example a predetermined function such as "increment by 1") and stores the altered value in a memory of the tag 102.
   b) the tag 102 incorporates the original or altered counter value (C#) and the static tag ID ($ID_T$) into a URL that points to the computer (for example http://www.nxp-.com/service.jsp?counter=1234&id=9876)
3. The URL (including the counter value (C#) and the tag ID ($ID_T$) is transmitted to the device 104 as part of the NDEF message.
4. The device 104 requests some means of authentication, such as a challenge prompt that requests authentication information, from an application programming interface of the computer 106.
5. The challenge prompt is generated by the computer 106 and returned to the device 104.
6. The device 104 undertakes a number of steps of:
   a) processing the challenge and preparing an answer. This process might require the presence of a previously issued certificate on the device 104 or the user to enter a valid username/password combination.
   b) accessing the URL previously read from the tag.
7. Upon accessing the URL, both counter value (C#) and tag ID ($ID_T$) can be transmitted implicitly as part of the URL to the computer 106, whereas the authentication response may be transmitted to the computer in any suitable way, which may include a universal resource indicator, URI.
8. As the computer 106 receives the URL and the authentication response (which together provide an authenticated service request), it can undertake one or more of a number of security measures:
   a. The authentication response is checked. For example, the presence of the valid username/password combination can be established in order to verify the authentication data. If the user cannot be authenticated successfully, the process is stopped and the request may be logged without executing an operation of the computer 106 that would provide a service to the device 104.
  b. The tag ID (ID$_T$), that is present in the URL, is looked-up in a database.
    i. If the tag ID (ID$_T$) is unknown, the process is stopped and the request may be logged without executing an operation of the computer 106 that would provide a service to the device 104.
    ii. The counter value of a previous or last request for this tag 102 is retrieved from the database of previous counter values.
  c. The counter value retrieved from the database is used to check the validity of a new counter value from the request, e.g.
    i. The new counter value (C#) should be later in a predetermined sequence of counter values than the counter values of previous requests from the database.
    ii. The counter value (C#) should not have suddenly jumped in value because this might indicate guessing by an attacker. For example, the counter value (C#) may be verified if it is within a threshold number of counter values from the last received request. If the counter value (C#) is more than the threshold number of counter values from the last received request, the counter value may not be verified.
    iii. Further checks, based on statistical/specific information associated with a particular implementation of the system 100 may be performed. For example, in a time tracking system for employees, an identification of multiple random requests by an employee immediately may lead to an alert being generated because this behaviour is considered unusual.
    iv. If any check fails, the process is stopped and the request may be logged
  d. If the counter value (C#) and the tag ID (ID$_T$) are verified, the computer 106 triggers an action according to the tag ID (ID$_T$) or provides a service or content to the device 104, depending on the actual application. In the example of a time tracking system, the computer may indicate to the user via the device 104 that his "come" or "leave" indication has been successfully recorded.
9. The computer executes an operation on verification of the counter value (C#) and the authentication data. The operation may include replying to, or relaying data to, the device 104.

In some examples, the tag ID (IDT) may not be required. For example, if a dedicated smart phone app is used and the computer 106 only allows any tag 102 to trigger a single action by the computer 106 then it is not necessary for the computer 106 to be able to distinguish between different tags 102.

In some examples, the message generated by the tag does not comprise a URL. If a dedicated smart phone app is used, the application itself might be aware of which backend system to connect to, and hence a URL is not required upon each tag read.

The authentication procedure described in steps 4-7 do not necessarily have to take place in a specific order. Any suitable method of authentication of the device 104 by the computer 106 may be used.

Through the combination of:
(1) a counter value that is stored in memory associated with the tag 102, which is propagated into the content served by the tag 102 to the device 104 (by using an NDEF message, for example) and then to the computer 106 (embedded in a URL for example); and
(2) the computer 106 using information from a counter transmitted by an authenticated smart phone, the security of the system 100 can be improved in order to serve a broad range of NFC-tag based applications. Such a system may discourage a would-be attacker from attempting a trial-and-error-type attack in which a large number of anonymous requests with different possible counter values (C#) are attempted in order to obtain a service from the computer 106.

For example, the system 100 may be used to implement an employee time recording system, for issuing electronic coupons, secure data monitoring or restricted content access.

Two dedicated tags 102 can be mounted at the entrance to a building. One tag is associated with the sign in, or "come", function, and the other tag is associated with the sign out, or "leave", function. Once an employee enters the building in the morning, he touches the "come" tag with his smart phone 104, which forwards information regarding his arrival to the backend computer 106. When the employee leaves at the end of the day, he touches the "leave" tag, which forwards information regarding his departure to the backend computer 106. In both cases, the backend computer 106 uses the method presented below to detect potential misuse of, or attacks on, the system 100 (for example by an employee lying about when he actually left by using modified phone software that postpones sending the "leave" request to the computer 106).

In advertising, posters that include a tag 102 are used to attract a user's attention. By touching the part of the poster where the tag is mounted with his smart phone 104, the user can be issued with a URL for an electronic coupon by the tag. The coupon may entitle the user to a free drink, for example. To ensure the user does not exploit the system and collect multiple coupons, the method described above can be used to control the issue of electronic coupons by the computer 106 to the device 104 for the registered user. For example, a single registered user may only be entitled to redeem one coupon obtained from the tag.

The tag 102 may be connected to, or in electronic communication with, a measurement device that provides measurement data to the tag 102, for example continuously or intermittently. Upon each touch between the tag 102 and the device 104, the current measurement data or recent measurement data can be transferred via the device 104 to the computer 106, for example as part of an NDEF message. In one example, temperature sensors can be installed with the tag 102 at certain locations inside a refrigerating plant. When an inspector periodically visits the sensor locations and touches the tag 102 the current measurement data can be transmitted to the computer 106 by the device 104. In certain industries, such as the food industry, the enhanced security offered by the present invention may assist with ensuring compliance with safety and legal standards. The NDEF message and request may contain a TAG ID and the counter value, both of which may be protected by a signature.

The invention can allow restricted content access for authorised users in an authorised location. For example, only visitors to a location where an NFC tag is mounted may be able to view certain web content or start a live video or audio stream from the Internet. In a shop, tags 102 attached to products can be used to direct the user's browser to a website with additional product information, or multimedia content, to enhance the shopping experience. In order to protect this information against public access from any competitor, the system requires a user to be physically present in the store and registered with the store.

It will be appreciated that any reference to "higher than", "greater than, "lower than", or "less than, etc, can refer to the parameter in question being less than or greater than a threshold value, or between two threshold values, depending upon the context.

The invention claimed is:

1. A method of operating a system, the system comprising a near field communication (NFC) tag, an NFC device associated with a user of the system and a computer, the method comprising:
    the NFC device requesting a message from the NFC tag;
    the NFC tag generating a message comprising a representation of a counter value, wherein each of the NFC device and NFC tag includes respective communication circuitry;
    the NFC tag sending the message to the NFC device;
    the NFC device generating a request including the representation of the counter value in response to receiving the message;
    the NFC device sending the request to a computer;
    the NFC device sending an authentication request to the computer;
    in response to the authentication request, the computer generating and transmitting an authentication challenge to the NFC device;
    the NFC device submitting user authentication data to the computer, based on the authentication challenge; and
    the computer executing operations on verification of the counter value and the user authentication data to detect malicious activity involving an unauthorized attempt to access the system by validating a dynamic change in the representation of the counter value relative to a previously-used representation of the counter value and by assessing that the dynamic change is not within a range of expected change.

2. The method of claim 1 further comprising the NFC device submitting user authentication data directly to the computer with the representation of the counter value, the user authentication data including information that provides identification of a user at the NFC device, further including associating the identification of the user with the request, and wherein the computer executing the operation includes transmitting content to the NFC device, based on content associated with the NFC tag.

3. The method of claim 1 further comprising the NFC tag obfuscating or encrypting the counter value before generating the message.

4. The method of claim 1 further comprising the NFC tag signing the message before sending the message to the NFC device.

5. The method of claim 1 wherein the message comprises a uniform resource identifier, URI, for the computer, wherein the URI includes the counter value and the identifier of the tag.

6. The method of claim 5 wherein the computer is a remote server on the internet and the uniform resource identifier is an internet address associated with the computer.

7. The method of claim 1 wherein an identifier for the computer is stored on the NFC device.

8. The method of claim 1 wherein the message generated by the tag and the request generated by the NFC device comprise an identifier of the tag.

9. The method of claim 1 wherein the NFC device performs the step of requesting a message and generating the request using generic software.

10. The method of claim 1 wherein the message is an NFC Data Exchange Format, NDEF, message.

11. The method of claim 1 further comprising:
    the NFC device including sensor data in the request and/or the NFC tag including sensor data in the message; and
    in the computer, using the sensor data in order to verify the identity of the user, therein associating user identities with each received request and providing tracking of attacker attempts access the computer.

12. A method of operating a time entry recording system, TERS, comprising performing the method of claim 1, wherein the NFC tag is associated with a function of the TERS, the NFC device is associated with a user of the TERS and the step of the computer executing the operation comprises recording a time associated with the function of the TERS and the user of the NFC device.

13. A method of operating an electronic poster, comprising performing the method of claim 1, wherein the NFC tag is configured to issue a coupon and is embedded in the poster and executing the desired operation of the computer comprises providing a service to the NFC device.

14. A system comprising a near field communication, NFC, tag, an NFC device associated with a user of the system and a computer, the system configured to perform the method of claim 1.

15. A computer apparatus for a time entry recording system (TERS), the computer apparatus comprising:
    a network interface circuit configured and arranged to receive one or more requests from a NFC device, the one or more requests comprising:
        an identifier of an NFC tag that is associated with a function of a time entry recording system and which provides a representation of a counter value to the NFC device,
        the representation of the counter value,
        a challenge request for authentication, and
        user authentication data for a user of the NFC device; and
    a processor circuit configured and arranged to provide time entry recording by verifying the counter value;
        respond to the challenge request by generating and transmitting an authentication challenge to the NFC device, therein causing the NFC device to communicate the user authentication data;
        verifying the user authentication data relative to the challenge request; and
        recording a time associated with the function of the TERS and the user of the NFC device upon verification of the counter value and the authentication data, the processor circuit being further configured and arranged to data to detect malicious activity involving an unauthorized attempt to access the system by validating a dynamic change in the representation of the counter value relative to a previously-used representation of the counter value and by assessing that the dynamic change is not within a range of expected change.

16. The method of claim 1, including, at the NFC tag, generating different messages comprising the representation of the counter value for successive requests received from NFC devices, therein ensuring that respective messages sent in response to the successive requests are different.

17. The method of claim 1, including mitigating unauthorized cloning of NFC tags by:
  within the NFC tag, for each of successive accesses by respective NFC devices, generating the message comprising the representation of a counter value, with each respective message generated in response to the successive accesses being different from other messages generated for other ones of the successive requests; and
  at the computer, detecting a cloned NFC tag in response to receiving respective requests from an NFC device comprising the same representation.

18. The method of claim 1, including detecting the storage and later use of messages obtained from the tag by:
  within the NFC tag, for each of successive accesses by respective NFC devices, generating the message comprising the representation of a counter value, with each respective message generated in response to the successive accesses being different from other messages generated for other ones of the successive requests; and
  at the computer, detecting that a message from the tag has been stored based on a request from an NFC device including the representation of the counter value as being one or more of: a value that is out of sequence, a value being more than a threshold greater than a previous value, and a value has been previously received.

19. The apparatus of claim 15,
  further including the NFC tag, the tag including a counter circuit and being configured and arranged to, for each successive request received from one or more NFC devices, generate a message comprising the representation of the counter value by utilizing different values of the counter for each request, therein ensuring that respective messages sent in response to the successive requests are different, and
  wherein the processor circuit is configured and arranged to identify attackers by:
    associating each request with a particular user based on the authentication data provided for the request;
    tracking a number of requests from each of a plurality of users, based on the associating; and
    identifying a particular one of the plurality of users as an attacker based on the tracked number of requests.

20. The method of claim 1, further including carrying out the indicated steps in claim 1 for a plurality of requests received from a plurality of NFC devices associated with different users of the system, and, for each request,
  using the user authentication data provide identification of a particular user,
  storing the identification of the particular user in connection with the request,
  tracking a number of requests submitted by each particular user, based on the stored identification, and
  identifying a particular user as an attacker based upon one or both of: a number of the tracked requests associated with the particular user, and an incorrect counter value associated with a request associated with the particular user.

* * * * *